Patented Mar. 5, 1929.

1,704,630

UNITED STATES PATENT OFFICE.

KARL SCHÖLLKOPF, OF DUSSELDORF-OBERKASSEL, GERMANY, ASSIGNOR TO RHEI-NISCHE KAMPFER-FABRIK GESELLSCHAFT MIT BESCHRANKTER HAFTUNG, OF DUSSELDORF-OBERKASSEL, GERMANY.

MANUFACTURE OF MENTHOL.

No Drawing. Original application filed November 28, 1922, Serial No. 603,853, and in Germany November 23, 1921. Divided and this application filed June 26, 1926. Serial No. 118,834.

The present invention refers to the manufacture of racemic menthol having the properties of the active menthol as obtained from natural sources, but being optically inactive. In my copending application Ser. No. 603,853 on November 28th, 1922, Patent No. 1,625,771, I have described a process for manufacturing racemic menthol, consisting in firstly heating thymol in presence of catalysts, promoting the hydrogenation with hydrogen under pressure, secondly separating by physical processes from the reaction product the crystallizable, crystalline racemate of menthol and thirdly subjecting the remaining liquid, non-crystallizable mixture of isomeric menthols to a new hydrogenation process with catalysts under pressure, if desired after having been added to fresh thymol.

The present process consists in carrying out the above named steps one and two, heating thirdly the liquid menthols mixture with dehydrogenation catalysts, by which the liquid menthols are transformed into a mixture of menthones, and heating the said mixture of menthones, after having been separated from the dehydrogenation catalysts, with hydrogenation catalysts and hydrogen under pressure, the latter step being carried out, if desired, after addition to fresh thymol. One employs then the steps 1 and 2 again.

As dehydrogenation catalysts one may use for instance copper oxide or nickel oxide, as hydrogenation catalysts for instance nickel, cobalt, platinum, palladium.

It has been known that menthone may be hydrogenized to menthol, but it was unknown to dehydrogenize the liquid menthol mixture from the hydrogenation of thymol under pressure, thus preparing a mixture of menthones, and hydrogenize such mixture under pressure, whereby the crystalline racemate of natural menthol may be prepared.

*Example:* 25 kilograms thymol are heated with 500 grams nickel catalysts with hydrogen to about 200 degrees centigrade under a pressure of 5–30 atmospheres. I may carry out the process in an autoclave and agitate the mass. After sufficient amounts of hydrogen having been absorbed, one separates the product of hydrogenation from the catalysts by distillation or filtration and separates the menthol from the liquid menthols mixture either by a freezing process or by fractional distillation.

By the freezing process (for instance at zero or minus five degrees centigrade) the menthol is solidified, whereas the liquid menthols mixture remains fluid and may be decanted or otherwise separated from the crystallized menthol. 15 kilograms of the liquid menthols mixture thus obtained are heated to about 200 degrees centigrade with 500 grams of copper oxide, preferably added with sodium hydroxide, until the evolution of hydrogen ceases. The menthone thus formed is heated with 250–500 grams catalyzing nickel and hydrogen under about 5 to 30 atmospheres pressure to about 200 degrees centigrade preferably with agitation. The mass is then treated as above described.

The menthone obtained from the liquid menthols mixture by dehydrogenation may be added to fresh thymol, for instance 25 kilograms and this mixture is then heated with 500–750 grams nickel catalysts with hydrogen to about 200 degrees centigrade under a pressure of 5–30 atmospheres. The resulting hydrogenation product is then treated as above described for the hydrogenation product from thymol.

I claim:—

1. The process of manufacturing inactive menthol which consists in heating thymol with hydrogen under pressure in the presence of hydrogenation catalysts, separating the inactive menthol from the mixture of liquid menthols, converting the latter by dehydrogenation into a mixture containing menthones and heating the mixture of menthones with hydrogen under pressure in the presence of hydrogenation catalysts.

2. The process of manufacturing inactive menthol which consists in heating thymol with hydrogen under pressure in the presence of hydrogenation catalysts, separating the inactive menthol from the mixture of the liquid menthols, converting the latter by dehydrogenation into a mixture containing menthones, adding the mixture of menthones to a new portion of thymol and heating this mixture with hydrogen under pressure in the presence of hydrogenation catalysts.

3. The process of manufacturing inactive menthol which consists in heating thymol with hydrogen under pressure in the presence of hydrogenation catalysts, separating the inactive menthol from the mixture of liquid menthols, dehydrogenating the latter by heating same with copper oxide as a catalyst and then heating the mixture of menthones obtained with the hydrogen under pressure in the presence of hydrogenation catalysts.

4. The process of manufacturing inactive menthol which consists in heating thymol with hydrogen under pressure in the presence of hydrogenation catalysts, separating the inactive menthol from the mixture of liquid menthols, dehydrogenating the latter by heating with a catalyst containing copper oxide, adding the mixture of menthones thus obtained to a new portion of thymol and heating the latter mixture with hydrogen under pressure in the presence of hydrogenation catalysts.

5. The process of manufacturing inactive menthol which consists in heating thymol with hydrogen under pressure in the presence of hydrogenation catalysts, separating the inactive menthol from the mixture of liquid menthols obtained, dehydrogenating the latter by heating with a catalyst of an oxide of the heavy metals and heating the mixture of menthones thus obtained with hydrogen under pressure in the presence of hydrogenation catalysts.

6. The process of manufacturing inactive menthol which consists in heating thymol with hydrogen under pressure in the presence of hydrogenation catalysts, separating the inactive menthol from the mixture of liquid menthols, dehydrogenating the latter by heating with a catalyst of an oxide of the heavy metals and adding the mixture of menthones thus obtained to a new portion of thymol and heating the latter mixture with hydrogen under pressure in the presence of hydrogenation catalysts.

In testimony whereof, I have signed my name to this specification.

KARL SCHÖLLKOPF.